United States Patent
Pedraza

(10) Patent No.: US 9,503,547 B2
(45) Date of Patent: Nov. 22, 2016

(54) SOCIAL NETWORK DATING SERVICE

(71) Applicant: Oscar Pedraza, Malvern, PA (US)

(72) Inventor: Oscar Pedraza, Malvern, PA (US)

(*) Notice: Subject to any disclaimer, the term of this patent is extended or adjusted under 35 U.S.C. 154(b) by 265 days.

(21) Appl. No.: 14/254,450

(22) Filed: Apr. 16, 2014

(65) Prior Publication Data

US 2014/0317189 A1  Oct. 23, 2014

Related U.S. Application Data

(60) Provisional application No. 61/813,467, filed on Apr. 18, 2013.

(51) Int. Cl.
| | | |
|---|---|---|
| H04L 29/08 | (2006.01) | |
| H04L 29/06 | (2006.01) | |
| G06Q 10/10 | (2012.01) | |
| G06Q 50/00 | (2012.01) | |
| H04L 12/58 | (2006.01) | |

(52) U.S. Cl.
CPC ............ H04L 67/306 (2013.01); G06Q 10/10 (2013.01); G06Q 50/01 (2013.01); H04L 63/0823 (2013.01); H04L 51/18 (2013.01); H04L 51/32 (2013.01); H04L 63/126 (2013.01)

(58) Field of Classification Search
CPC ...... G06Q 50/01; G06Q 10/10; G06Q 50/10; G06Q 20/382; H04L 67/306; H04L 51/18; H04L 51/32; H04L 63/126; H04L 63/0823
See application file for complete search history.

(56) References Cited

U.S. PATENT DOCUMENTS

| | | | |
|---|---|---|---|
| 7,613,706 B2 | 11/2009 | Terrill et al. | |
| 8,010,556 B2 | 8/2011 | Terrill et al. | |
| 8,032,555 B2* | 10/2011 | Morgenstern | G06Q 30/02 707/783 |
| 8,489,516 B1* | 7/2013 | Nielsen | G06F 21/6245 705/319 |
| 2004/0260781 A1 | 12/2004 | Shostack et al. | |
| 2005/0160094 A1* | 7/2005 | Morgenstern | G06Q 30/02 |
| 2008/0250332 A1* | 10/2008 | Farrell | G06Q 10/10 715/753 |
| 2009/0271409 A1* | 10/2009 | Ghosh | G06Q 10/10 |
| 2011/0119335 A1* | 5/2011 | Galbreath | G06Q 30/02 709/204 |
| 2013/0024516 A1* | 1/2013 | Blinder | G06Q 30/02 709/204 |
| 2013/0066962 A1* | 3/2013 | Scherzinger | G06Q 50/01 709/204 |
| 2015/0074825 A1* | 3/2015 | Blake | G06F 21/6245 726/28 |

* cited by examiner

Primary Examiner — Thomas Dailey
Assistant Examiner — Ruth Solomon
(74) Attorney, Agent, or Firm — Cozen O'Connor

(57) ABSTRACT

The invention relates to an online dating system in which users of the system maintain profiles listing friends, and in which only other users within a specified degree of relationship within a given user's social network can view the user profile of that given user.

15 Claims, 4 Drawing Sheets

SOCIAL NETWORK DATING SERVICE

CROSS-REFERENCE TO RELATED APPLICATION

This application claims priority to U.S. provisional application Ser. No. 61/813,467 filed Apr. 18, 2013, which is incorporated herein by reference in its entirety.

FIELD OF INVENTION

The present application is generally related to the field of dating websites and, more particularly, to a system and method for providing a dating service within a social group.

BACKGROUND OF THE INVENTION

Dating websites generally allow users to maintain online profiles with pictures, factual information about themselves, their likes and dislikes, and other personal information. These profiles can be searched for and viewed by other users of the website. Some dating websites tailor the profile search to information provided by the user so that the search results highlight or are limited to other users who live nearby, who share similar interests, who are more compatible, etc. See U.S. Pat. Nos. 7,613,706 and 8,010,556, and U.S. Pub. Ser. No. 10/740,174.

Dating websites also allow for some level of communication between users. For example, if a first user searches the profile of a second user and is interested in the second user, the first user can initiate a dialogue with the second user. The second user has the option of responding or not responding. In many dating websites, the users also have the capability of blocking other specific users so that those specific users are prevented from searching the first user's profile and/or communicating with the first user.

One drawback of traditional dating websites is that, with respect to any given user, most other users of the website are complete strangers. Thus, if a first user is contacted by a second user, the first user does not have anyone to vouch for the second user. Moreover, the first user is not even capable of verifying that the information in the second user's profile is accurate. The second user could be using someone else's picture, lying about his/her personal information, or even using an alias. Even if the first user was "matched" with the second user with respect to purported compatibility, as is common in a number of dating websites, the first user has no way of knowing whether the second user provided spurious answers to the questions that determine compatibility. For this reason, there is always a level of uncertainty and possibly danger associated with meeting another dating-website user in person.

Each and every reference cited herein is hereby incorporated by reference in its entirety, where appropriate, for teachings of additional or alternative details, features, and/or technical background.

SUMMARY OF THE INVENTION

Figure 2:
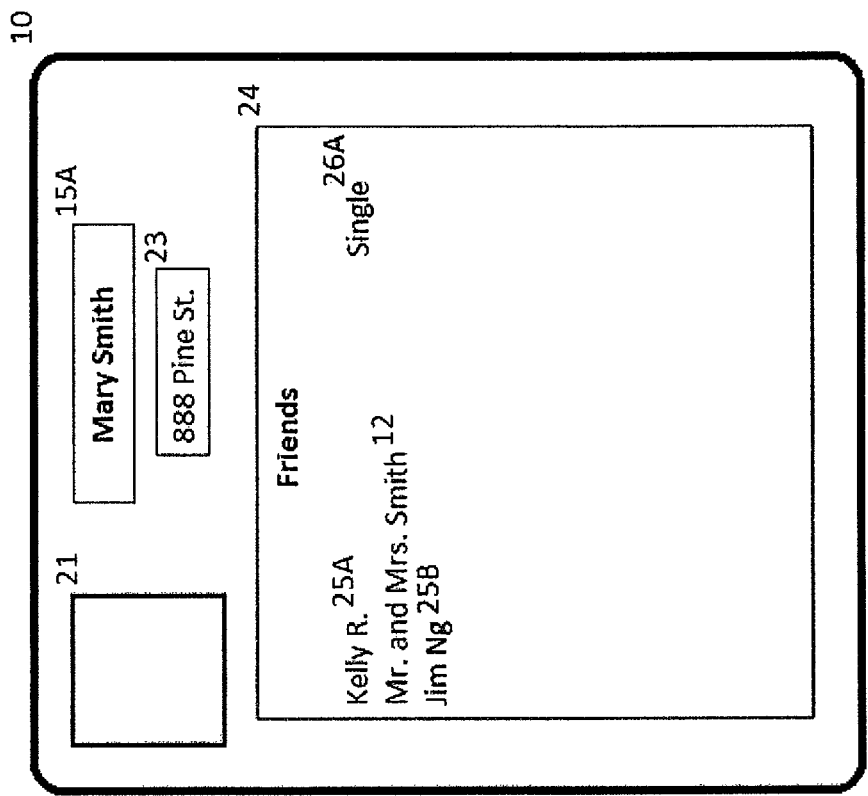
FIG. 2 identifies a simplified diagram of a second component of one embodiment of the invention described herein.

A first embodiment disclosed herein is a dating website configured to be used over the internet comprising a plurality of user profiles, each user profile comprising personal information relating to the particular user, and a list of friends of said particular user; wherein a first user can only view a user profile of a second user if the second user is within a required degree of relationship of the first user, and wherein at least one user profile belongs to a non-single user.

Another embodiment is a method for providing a feature on a dating website, comprising steps of interfacing with users in an electronic processing environment in which software is employed, enabling users to create and maintain user profiles, each comprising the personal information of a particular user of the system, and a list of friends of said particular user; enabling a set of two users that know each other to establish that the two users are friends; and preventing a first user from viewing a user profile of a second user unless the second user is within a required degree of relationship of the first user.

Another embodiment is an online dating system comprising a system for confirming the identity of a user, which includes a network including data servers and session servers. The system includes: a computing device having a web browser program accessed and displayed on the computing device; a website comprising a plurality of user profiles, each said user profile comprising the name and relationship status of each user; wherein a user profile of a second user is displayed to a first user only if the first user has at least one non-single friend in common, on the dating system, with the second user.

In some embodiments, communication between two users occurs only where either the two users are friends, or where the two users have a mutual friend who permits contact between the two users. A particular embodiment includes the feature wherein to initiate contact with a non-friend who has at least one friend in common with the first user, an invitation or friend request sent from said first user to said non-friend is first sent to said mutual friend for confirmation. Upon confirmation of said invitation or friend request, the first user and non-friend become friends on the system, enabling their communication.

An additional embodiment of the invention is a dating website wherein the website is configured so that only users within a first degree of a first user's social network can view the first user's profile.

An additional embodiment of the invention is a dating website wherein the website is configured so that only users within a first or second degree of a first user can view the first user's profile.

In some embodiments, users outside the required degree of relationship that cannot see the full profile of another user may still be able to see an abbreviated profile. In further embodiments, users outside the required degree of relationship of another user are able to see the full profile of the other user, but not contact that other user. In still further embodiments, closer degrees of relationship with another user result in successive tiers with increasing access to the other user; e.g., users within the third degree of relationship can view an abbreviated profile, users within the second degree of relationship can view the full profile, and users within the first degree of relationship can contact the other user. In still further embodiments, each user can set specific access and viewing privileges for each degree of relationship; e.g., on user can decide that only those in the first or second tier can view the user's relationship status, etc.

An additional embodiment of the invention is a dating website comprising a plurality of user profiles including single and non-single user profiles, wherein each non-single user profile comprises at least the user's name, gender, relationship status, and a list of friends; wherein a user can only see profiles of another user on the system where the two users are friends or have a mutual friend in common; wherein two users on the system can only communicate with one another if the two users are friends on the system; wherein to create a friend status, a non-single user on the system must initiate contact between two non-friend users to create the friend link between the two users.

An additional embodiment of the invention is a dating website wherein a single friend of a non-single user is not listed on the non-single user's list of single friends unless both the non-single user and single friend elect to include the single friend on the non-single user's list of single friends.

Additional embodiments of the invention include methods of implementing the steps of the various embodiments of the dating website system referenced above.

The disclosed embodiments of the invention may be used in conjunction with other computer optimization techniques, methodologies and filtering techniques to easily and quickly gain optimized or near optimized solutions in the quickest most economical way possible to provide for an enhanced user experience, dating opportunities, mechanisms for communicating with non-friends and with friends, and mechanisms for confirming the identity of another user.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE DRAWINGS

The embodiments of the invention and the various features and advantages thereto are more fully explained with references to the non-limiting embodiments and examples that are described and set forth in the following descriptions of those examples. Descriptions of well-known components and techniques may be omitted to avoid obscuring the invention. The examples used herein are intended merely to facilitate an understanding of ways in which the invention may be practiced and to further enable those skilled in the art to practice the invention. Accordingly, the examples and embodiments set forth herein should not be construed as limiting the scope of the invention, which is defined by the appended claims.

Embodiments of the systems described herein include data servers and session servers that are connected through a real-time communication network, such as the Internet, i.e., a "cloud", and are accessible over the Internet using protocols and web browsing techniques that are generally known. Cloud computing is a computing model in which computing resources such as storage space and processing power can be remotely managed.

The description provided herein is complete and sufficient for those of ordinary skill in the arts of systems and web development to implement the methods and systems as described. One embodiment of a dating system may employ a server running an operating system, such as Linux, web-server software, such as Apache, and a database such as MySQL, with methods implemented though a software development language such as PHP or Java. However, other suitable hardware, operating systems, software, databases, and programming language may be implemented or utilized by those of skill in the art.

As used herein, terms such as "a," "an," and "the" include singular and plural referents unless the context clearly demands otherwise.

A "social network" is a user driven network of user profiles that can be narrowed or expanded by a user to include persons related by N degrees. A first degree is a friend of the user as determined by the creation of a friend link within the network; a second degree is a friend of the friend of the user, etc.

The term "community" generally refers to the entire set of users that have user profiles within a dating website.

One embodiment of the present invention is a dating website wherein users of the website are virtually linked to members of their social network who are also users of the dating website. As used herein, a user means any person or group of people who have a user profile on the dating website. A user need not be single or interested in dating to maintain a user profile on the dating website. Indeed, one advantage of an embodiment of the dating website is that non-single users drive the communication between non-friend users within the community by providing introductions between users, vouching for users, confirming information of other users, among other features. In essence, this allows users who do not know one another to confirm the identity of the other person, before meeting, whether online or in person.

An online dating website in accordance with one embodiment provides a method and system for improving reliability of online dating profiles through the inclusion of community members who are non-single. In a typical dating website, the community of users is full of other single people. The problem with this system is that there is potential for fraudulent or misleading profiles, thus wasting the time, energy, and emotional energy of users. To combat the propensity for these fraudulent or misleading profiles, an embodiment of the system includes the limitation that a user may only join the community if the user has an association with another community member that is not single.

A goal of one embodiment is to create a community where the information about community members has greater reliability based on the watchful eyes of other community members. In some embodiments, the website is intended to have non-single friends assist single friends with making introductions, and creating opportunities to meet other friends in their network.

Thus, in some embodiments, a non-single member serves as a referee, or a validator of sorts, in confirming information on a profile, confirming that the person actually exists, confirming that they are single or non-single, confirming the sexual orientation of the individual, etc. Accordingly, information that is false or misleading on a profile is less likely to occur or to be perpetuated because of the requirement to have a check and balance system before initiating new relationships or friendships on the dating website.

In some embodiments, users may join the website in ways known in the art. For example, creating a user name and a password. The website collects additional information, such as the user's real name, where they live, and their relationship status. In some embodiments, each user profile receives a unique identifier for their profile. This unique identifier can then be utilized to contact another user, within the bounds of the system. Other mechanisms of contacting users are also contemplated, such as sending messages through the system to an individual user, sending an invite through a mutual friend, or sending an invite through a friend of a friend. Where the users are not already friends, mechanisms exist to create a friend link, i.e. to confirm friend status between two user profiles within the system.

This process of vetting the user through another member of the community seeks to ensure that the parties actually know one another, that the information about each of the parties, i.e. their name, gender, relationship status, etc. are correct, and thus creating an improved dating system. Furthermore, an opportunity is provided to allow the common friend to communicate with one or both parties about whether there is a good fit for dating and/or friendship. In some embodiments, the relationship status of the common friend is immaterial, thus allowing single or non-single friends to function identically.

Figure 1:
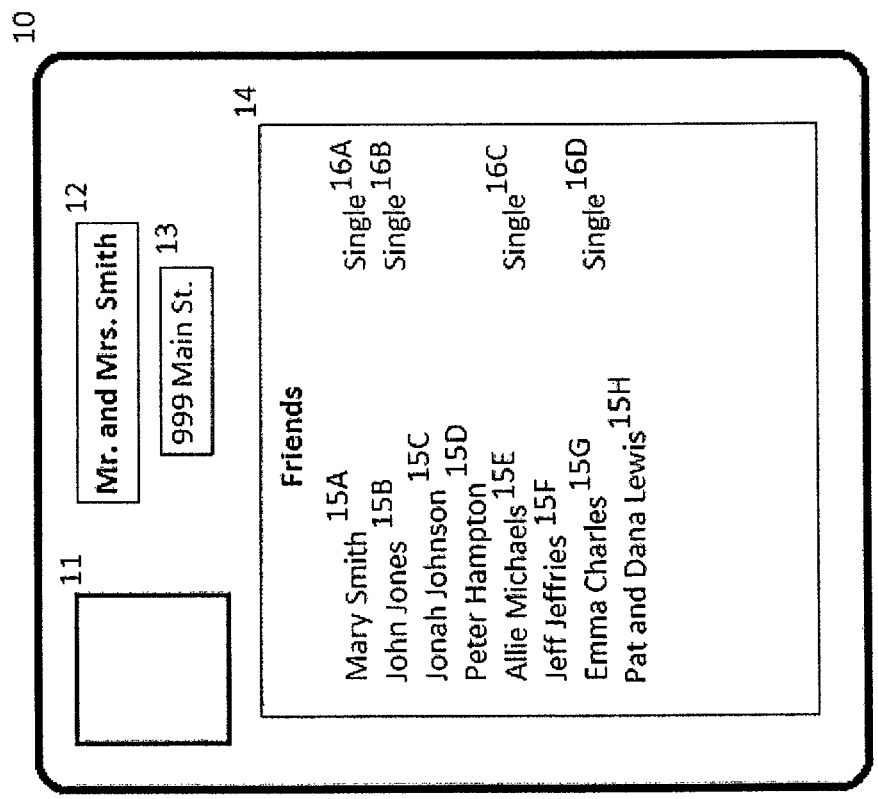
FIG. 1 identifies a simplified diagram of a component of one embodiment of the invention described herein.

FIG. 1 depicts an embodiment of a user profile 10 of a user on the dating website. This user profile 10 includes the name 12 and address 13 of the user, as well as a photograph 11. Additionally, the user profile 10 includes a list 14 of friends 15A-15H who are also users of the dating website. The list 14 also contains indications 16A-16D of each friend's dating status, i.e. single or not-single. The term single is a broad term that includes unmarried, not engaged, not in a relationship, not in an exclusive relationship, living alone, interested in dating, and/or any other idea that conveys the user's possible interest in dating.

In the embodiment of FIG. 1, the users who maintain the user profile 10 are not interested in dating. Nonetheless, an advantage of this embodiment of the current invention is that it allows a non-single user to maintain a user profile 10 and list friends 15A-15H so that friends of the non-single user can browse through the list 14 of the non-single user's friends 15A-15H and see who is single. For example, Mary Smith 15A may not personally know John Jones 15B. However, on the dating website, Mary Smith 15A can look at the list 14 of friends 15A-15H in the user profile 10 of Mr. and Mrs. Smith 12. Thus, this embodiment provides an advantage over traditional dating website because it enables Mary Smith 15A to ask a mutual friend, in this case Mr. and Mrs. Smith 12, about John Jones 15B before initiating contact with him.

A user has the option of using an identifier to signal that they are single or non-single. Such identifier may include words, symbols, colors, images, or other difference between single and non-single profiles to serve as a mechanism to identify single and non-single profiles. A user may choose how to identify himself/herself, or may choose a third option—not identifying their status as single or non-single.

In some embodiments, there exist other mechanisms to initiate a friendship, create friend links with other users, or to gain the ability to see another user's full profile. For example, a non-user may join the website via an invitation to join (i.e. an email having a link having embedded functionality) sent by another user, whereby a friend link is created on the system upon registration to the website. Additionally, a friend link could be generated by another mechanism, e.g., through the use of unique ID's, passwords, answers to personal questions, or through another confirmation system, many of which are known in the art.

FIG. 2 depicts an embodiment of a user profile 10 of Mary Smith 15A, containing her name 15A, picture 21, address 23, and list 24 of friends 12, 25A, and 25B using the dating website. There is also an indication 26A that one of her friends, Kelly R. 25A is single.

Taking FIGS. 1 and 2 together, Profiles 12, 15C, 15D, 15F, 15H, and 25B are non-single profiles. In some embodiments, the non-single profiles act as the facilitator of all interactions between single parties. For example, the profile of Mr. and Mrs. Smith 12, would allow single profiles 15A, 15B, 15E, and 15G to contact one another as mutual friends of Mr. and Mrs. Smith. Other embodiments require that a contact be sent through the non-single profile, as a means of "introducing" the single parties to one another through the mutual non-single friend. Thus, Mary Smith 15A having non-single friends Mr. and Mrs. Smith 12, and Jim Ng 25B, has two friends to create introductions to other single parties in some embodiments.

In some embodiments, as users change status from single to non-single, or vice versa, such change in status should not eliminate their ability to be a reference to friends. Accordingly, a profile that is determined as non-single at one point in time, can change status, but retain the features of a non-single contact for their friends. In other embodiments, parties may choose to allow contact between both single and non-single profiles, or allow mutual friends, regardless of relationship status to confirm status or messages to non-friends.

Figure 3:
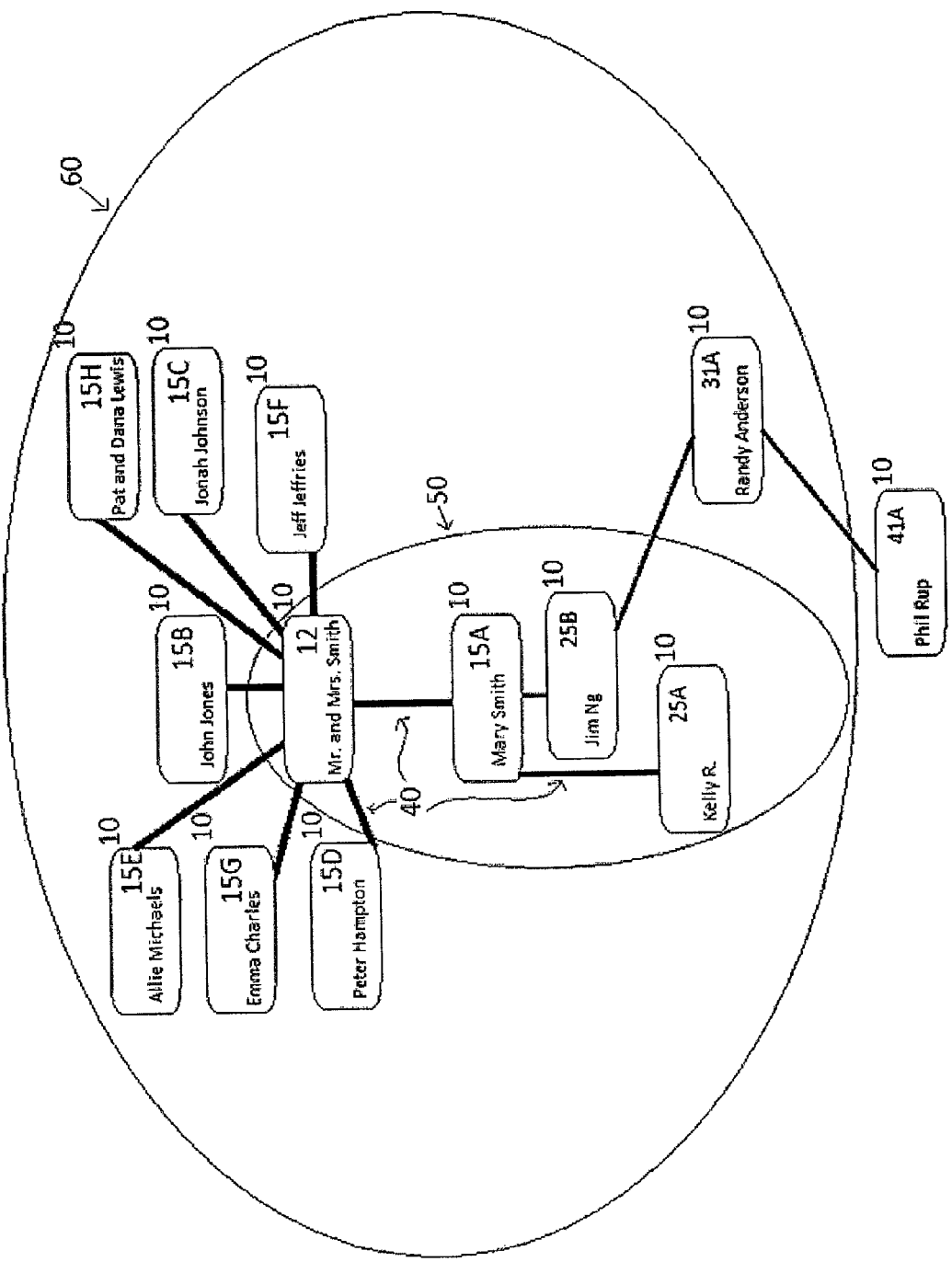
FIG. 3 identifies an aspect of an embodiment of the invention described herein.

In some embodiments, users are limited to viewing only the user profiles of other users within a certain degree of relationship within the same social network. FIG. 3 depicts the social network aspect of an embodiment of the dating website. The first degree of relationship 50 within a social network for a given user includes only the "friends" of that user. "Friend" and "friendship" need not carry any special meaning beyond that of an acknowledgement that the two users know each other. "Friends" can include family, coworkers, acquaintances, or even people that have only met online or through the dating website itself. In FIG. 3, friendship connections (or friend links) are depicted via lines 40 connecting the user profiles 10 of the friends. For example, Mary Smith 15A is friends with Mr. and Mrs. Smith 12, Kelly R. 25A, and Jim Ng. 25B; these users make up Mary Smith's 15A first degree of relationship 50.

The second degree of relationship includes not only the friends of a given user, but also the friends of those friends. In FIG. 3, Mary Smith's 15A second degree of relationship 60 includes those friends in the first degree of relationship 50, and also friends of those friends; including the Mr. and Mrs. Smith's 12 other friends 15B-15H and Jim Ng 25B's friend 31A. The third degree of relationship (not shown in FIG. 3) also includes friends of friends of friends, and so on. In one embodiment of the invention, users can only view the user profiles of other users within the first or second degree of relationship. However, it is contemplated that other embodiments could use other degrees of relationship as a limitation. Further, in other embodiments, the degrees of relationship impart other limitations such as the limiting the ability to contact the user or the preventing certain aspects of the user's profile to be seen.

Figure 4:
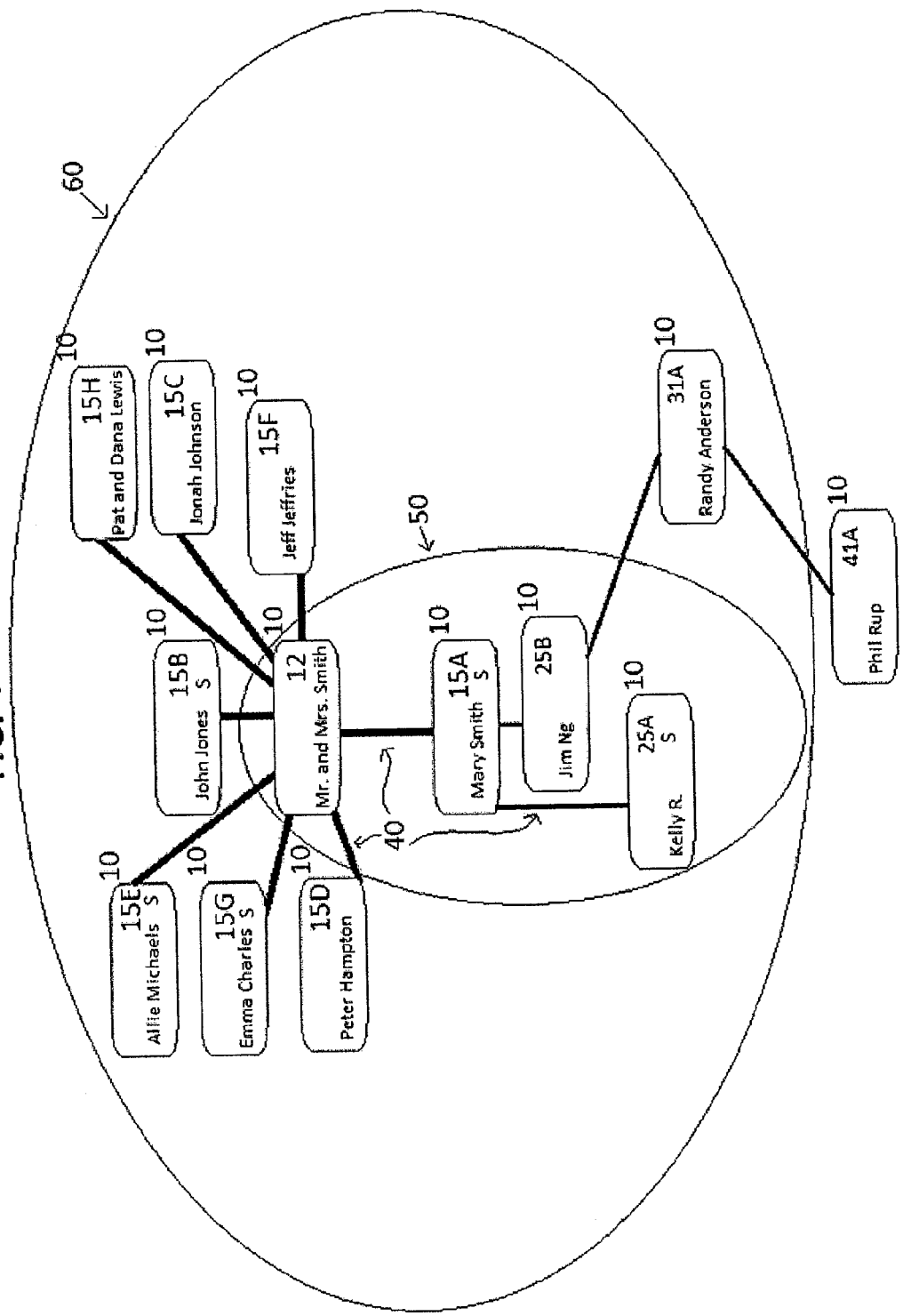
FIG. 4 identifies an aspect of an embodiment of the invention described herein.

FIG. 4 further adds an "S" identifier to the profile, for example below 15A and 25A, as a status identifier. This is but one example of the mechanism of identifying single and/or non-single profiles as a way to differentiate those interested in dating.

In other embodiments of the invention, users are capable of choosing their own relationship) to see her profile; but a second user could choose to allow friends of friends of friends ($3^{rd}$ degree of relationship) to see her profile. Furthermore, users can choose to limit relationships based on having at least one non-single friend in common to a first or Nth degree, or having a certain number of non-single and/or single friends in common before a contact can be pursued.

In a further embodiment of the invention, a user can choose whether or not he or she will appear on a given friend's list of friends. In another embodiment, a user can choose whether or not he or she will appear as single on a given friend's list of friends.

A further embodiment of the invention is a dating website comprising a plurality of user-created profiles, wherein profiles of users are single or non-single, providing a means for single users to identify other single users through mutual friendship of an Nth degree, typically one, two, or three degrees of separation.

In one embodiment, the non-single users are the key drivers of the dating website. That is, the non-single users provide for the means for single users to draw a contact to another single user, to confirm the status of that other single user, and to make a contact where both single users have a known contact in common. By driving the relationships through non-single users, a user can have greater confidence in the veracity of the information regarding another single user and create a safer dating environment than would otherwise be possible.

Furthermore, this provides a vehicle for users to find suitable partners within a certain community, based on the non-single user in common. This provides for an improved selection of compatible dating parties, because there exists a greater chance for the users to have common interests. This provides for a filter based on selection within possible socioeconomic levels, religious affiliations, common social interests, charitable interests, political affiliations, sexual orientation, and other interests that may align people based on their common relationships. In alternative embodiments, the non-single user may also be a single user.

Figure 6:
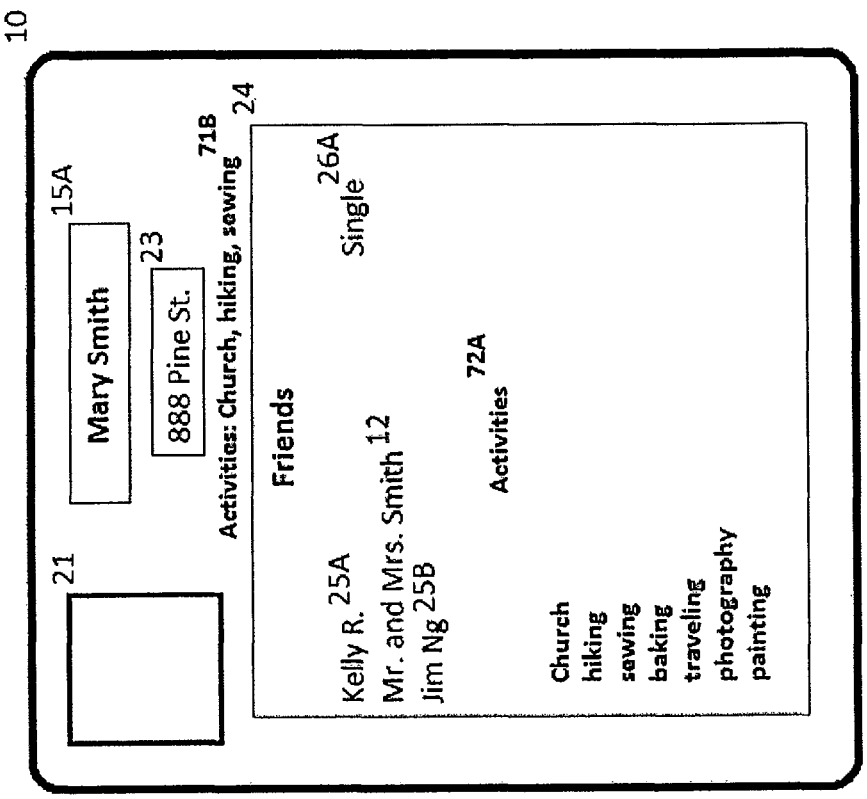
FIG. 6 identifies an aspect of an embodiment of the invention described herein.
Figure 5:
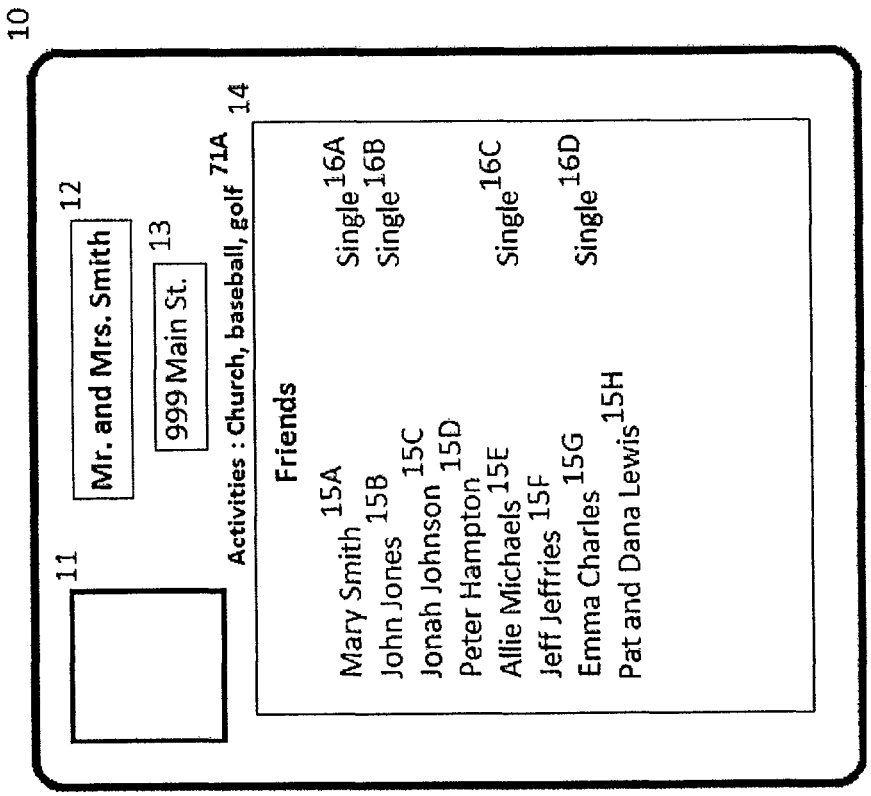
FIG. 5 identifies an aspect of an embodiment of the invention described herein.

The website further enables a user to filter users based on interests. In view of FIGS. 5 and 6, Mr. and Mrs. Smith 12 have at least three activities 71A listed on their profile. In more detail, in FIG. 6, Mary Smith 15A lists three activities 71B and has a further list of activities 72A shown on a portion of her profile 10. Mary Smith 15A and Mr. and Mrs. Smith 12 have at least one activity in common, Church. The website can then utilize these particular interests to provide greater information to single and non-single parties about the potential compatibility between users.

In a particular embodiment, a user is capable of sending an invitation to two other users, suggesting that the two users are a compatible match. This allows, for example, a single or non-single friend to set up two other users who are not already friends or dating. This provides that the two users will have some confirmation of the other user based on a friend in common.

A further embodiment utilizes the feature of allowing a first user to send a message to a non-friend, wherein before the message is delivered to the non-friend, the communication must be approved by a mutual friend. Accordingly, when the first user sends the message, an option appears to select a mutual friend in common between the first user and the non-friend. The first user can select the mutual friend for confirmation. Thereafter the message is sent to the mutual friend for confirmation, and upon confirmation, sent to the non-friend. This creates a system wherein the mutual friend is aware of the possible connection and allows both the first user and the non-friend to confirm the status of each, with the mutual friend. In some embodiments, the mutual friend is of a first degree. In other embodiments the mutual friend is of a second or third degree.

It is further contemplated that in some embodiments a first user sends a message to a non-friend second user. Upon sending, a confirmation requires a password, unique ID or other approval key to send the message. Where the two users know one another, sharing of the approval key is easily facilitated. Wherein the first user does not have an approval key, the first user may then have a mutual friend confirm the message, as in the embodiment described above. Accordingly, real friends would not be limited to the confirmation through a third-party, only non-friends. This allows confirmation of the identities, among other benefits on the website.

Accordingly, the embodiment provides a system for confirming the identity of a non-friend user by utilizing a mutual friend as an introductory person. While one mechanism is described above, one of skill in the art will recognize that there are numerous ways to program the step of sending a message, requiring a second user to confirm the message, and only upon receiving said confirmation, actually delivering the message to a third user. Accordingly, recent trends of catfishing and hoax relationships can be prevented by simple confirmation through a known third-party.

The invention now being fully described it will be apparent to one of ordinary skill in the art that many changes and modifications can be made thereto without departing from the spirit or scope of the appended claims.

What is claimed is:

1. A website dating system, comprising a hardware processor and a non-transitory computer readable memory, configured to be used over the internet comprising:
    a plurality of user profiles, each comprising personal information of a particular user and a list of friends of said particular user;
    wherein a first user and second user are connected to a non-single user by a first degree, and to one another by a second degree,
    wherein the system is configured such that a first user can only view a user profile of a second user if the second user is within a required degree of relationship of the first user;
    wherein a message is generated by said first user and sent to said second user, wherein before the message is delivered to said second user, the system generates an approval key which is required to be delivered to said non-single user connected to the first and second users by a first degree; and
    wherein said message is delivered to said second user upon entry of the approval key by the first user who generated the message.

2. The website dating system of claim 1, wherein the second user can select the required degree of relationship.

3. The website dating system of claim 1, wherein the list of friends comprises an indication of a given user's relationship status.

4. The website dating system of claim 1, wherein the system is configured such that each particular user can choose whether to be listed on the particular user's friend's list of friends.

5. The website dating system of claim 3, wherein the system is configured such that each particular user can choose whether to indicate the particular user's relationship status on the particular user's friend's list of friends.

6. A method for generating a message between two users, which are each connected to a mutual, non-single user by a first degree on a dating website, comprising:
    interfacing with users in an electronic processing environment in which software is employed;
enabling said users to create and maintain user profiles, each comprising the personal information of a particular user of the system and a list of friends of said particular user;
    enabling a set of two users that know each other to establish that the two users are friends;
generating a message between a first user and a second user, wherein the first and second users are related by at least the third degree;
    sending said message from said first user to said second user, wherein, before the message is transmitted, generating an approval key which is required to be transmitted to the mutual, non-single user connected by the first degree of the first and second users; and
    wherein the system sends the message to the second user upon entry of the approval key by the first user who generated the message.

7. The method of claim 6, wherein the required degree of relationship between the first and second user is the second degree of relationship.

8. The method of claim 6, wherein the list of friends comprises an indication of whether a given friend is single.

9. The method of claim 6, further comprising a step of enabling the particular user to choose whether to be listed on the particular user's friend's list of friends.

10. The method of claim 8, further comprising a step of enabling the particular user to choose whether to be indicated as single on the particular user's friend's list of friends.

11. The method of claim 6, further comprising a step of preventing the first user from generating a message to the second user via the dating website unless mutual, non-single user connected to the first and second user by a first degree first permits contact between the first and second user.

12. An online dating system comprising a system for confirming the identity of a user, which includes:
    a network including data servers and session servers;
    a computing device for a first and second user, having a web browser program accessed and displayed on the computing device, and a computing device for at least a non-single user connected to the first and second users by a first degree, having a web browser accessed and displayed on the computing device;
    a website comprising a plurality of user profiles, each said user profile comprising the name and relationship status of each user;
    wherein a user profile of a second user profile is displayed to the first user only if the first user has at least one non-single user connected to the first and second users by a first degree, on the dating system;
    wherein sending a message between users who are connected by greater than the first degree, comprises generating the message on the computing device of the first user and sent to the computing device of said second user, wherein the system generates an approval key which is required to be delivered to said non-single user; and
    wherein the message is only transmitted to the computing device of the second user after the first user enters the approval key into the system.

13. The online dating system of claim 12, wherein the list of friends comprises an indication of a given user's relationship status.

14. The online dating system of claim 12, wherein the system is configured such that each particular user can choose whether to be listed on the particular user's friend's list of friends.

15. The online dating system of claim 12, wherein the system is configured such that each particular user can choose whether to indicate the particular user's relationship status on the particular user's friend's list of friends.

* * * * *